(12) United States Patent
Sisk et al.

(10) Patent No.: US 7,758,017 B2
(45) Date of Patent: Jul. 20, 2010

(54) BUTTERFLY VALVES AND CONSTRUCTION THEREOF

(75) Inventors: Gregory E. Sisk, Farmington, MO (US); Sidney Rovira, III, St. Amant, LA (US)

(73) Assignee: Sure Seal, Inc., Mineral Point, MO (US)

( * ) Notice: Subject to any disclaimer, the term of this patent is extended or adjusted under 35 U.S.C. 154(b) by 579 days.

(21) Appl. No.: 11/625,811

(22) Filed: Jan. 22, 2007

(65) Prior Publication Data

US 2008/0173841 A1 Jul. 24, 2008

(51) Int. Cl.
*F16K 1/22* (2006.01)
(52) U.S. Cl. ...................... 251/306; 251/305
(58) Field of Classification Search ............. 251/305, 251/306; 123/337
See application file for complete search history.

(56) References Cited

U.S. PATENT DOCUMENTS

| 3,837,620 A | * | 9/1974 | Malloy et al. ............ 251/306 |
| 4,266,754 A | * | 5/1981 | Ninomiya et al. ........ 251/306 |
| 4,317,558 A | * | 3/1982 | Sherlaw .................. 251/306 |
| 4,318,422 A | * | 3/1982 | Nakanishi et al. ........ 137/246 |
| 4,699,357 A | | 10/1987 | Sisk |
| 4,822,001 A | | 4/1989 | Sisk |
| 4,998,708 A | * | 3/1991 | Pavanel .................. 251/306 |
| 5,207,411 A | | 5/1993 | Sisk |
| 5,360,030 A | | 11/1994 | Sisk |
| 7,357,372 B2 | * | 4/2008 | Shakagori et al. ........ 251/306 |

* cited by examiner

*Primary Examiner*—John K Fristoe, Jr.
(74) *Attorney, Agent, or Firm*—Harness, Dickey & Pierce, P.L.C.; Kevin Pumm

(57) ABSTRACT

Various exemplary embodiments of a butterfly-type valve that provide a reduction in the unseating torque are disclosed that include a valve body defining a flow passage therein, and a closure disc disposed in the flow passage that has an axis of rotation about which the closure disc rotates between open and closed positions. The valve includes a cylindrical body liner disposed within the valve, which includes a circumferential sealing surface that is engaged by the closure disc to establish a seal when the closure disc is rotated to a closed position. At least one resilient band is at least partially interposed between the valve body and the cylindrical body liner, and at least a portion of the resilient band is tapered to a reduced thickness. The taper reduces the forces associated with the engagement by the closure disc, to thereby reduce the unseating torque required to open the closure disc.

20 Claims, 5 Drawing Sheets

BUTTERFLY VALVES AND CONSTRUCTION THEREOF

FIELD

The present disclosure relates to valve sealing structures utilizing a closure member, and more particularly to butterfly-type valves.

BACKGROUND

The statements in this section merely provide background information related to the present disclosure and may not constitute prior art.

Many valve design have closure members that must provide a seal with respect to fluid flowing through the valve. Butterfly valves are one such valve, which provides a sealing structure utilizing a closure member that is rotatable about the axis of an actuator. Various butterfly valves have included valve closure members that are designed to provide for a better seal between the closure member and the seat surface. However, butterfly-type valves have a tendency for fusion to occur between the materials used for the closure member and the seat surface when the two structures are in engagement with each other, such that the closure member requires significant torque to open the valve.

SUMMARY

The present disclosure describes various exemplary embodiments of a butterfly-type valve that provides for a reduction in the torque required to unseat a closure disc from a closed position within the valve. In one aspect of the present disclosure, various embodiments of a butterfly-type valve are described that include a valve body defining a flow passage therein, and a closure disc disposed in the flow passage that has an axis of rotation about which the closure disc rotates between open and closed positions. The various embodiments of a butterfly-type valve further include a resilient cylindrical body liner disposed within the valve body, which liner includes a circumferential sealing surface that is engaged by the periphery of the closure disc to establish a seal when the closure disc is rotated to a closed position. The various embodiments further include at least one resilient band being at least partially interposed between the valve body and the resilient cylindrical body liner. At least a portion of the resilient band is tapered to a reduced thickness, such that the reduced thickness reduces the forces associated with the engagement by the closure disc, to thereby reduce the unseating torque required to overcome the engagement with the liner's circumferential sealing surface.

In another aspect of the present disclosure, various embodiments of a resilient band are described. In at least one embodiment, a resilient band is provided that includes tapered portions depending from at least one center portion having an opening therein. The resilient band is adapted to be at least partially interposed between a valve body and a circumferential liner wall, and is configured to permit deflection of the circumferential liner wall when the circumferential liner wall is engaged by a valve closure disc. The tapered portions of the resilient band have a reduced thickness that reduces the forces associated with the engagement by the closure disc to thereby reduce the unseating torque required to overcome the resistance to movement of the closure disc caused by the engagement with circumferential liner wall.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
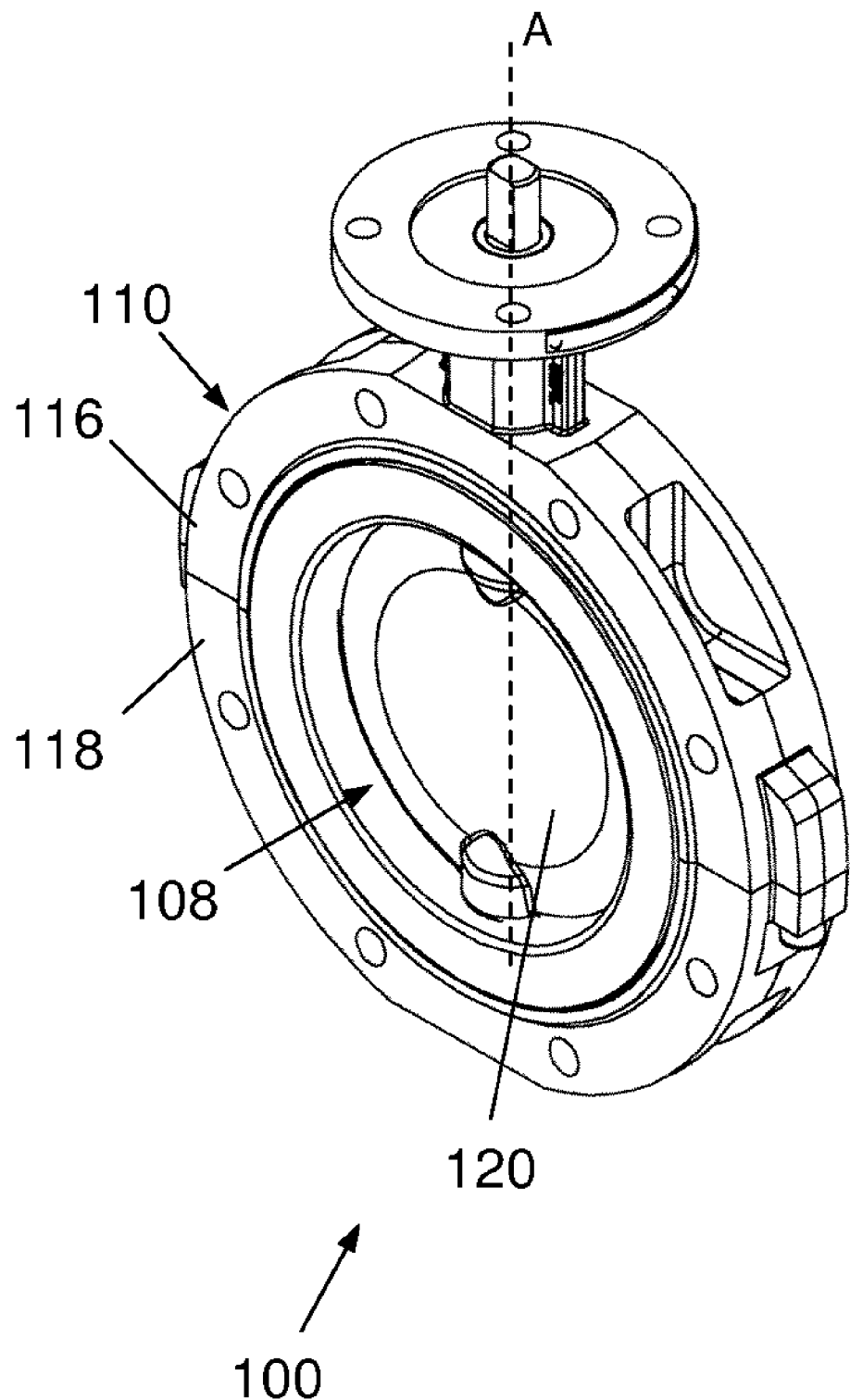
FIG. 1 is a perspective view of one embodiment of a valve having a closure disc and other components in accordance with the present application.

The following description is merely exemplary in nature and is not intended to limit the present disclosure, application, or uses. It should be understood that throughout the drawings, corresponding reference numerals indicate like or corresponding parts and features.

The present disclosure describes various exemplary embodiments of a butterfly-type valve that provides for a reduction in the torque required to unseat a closure disc from a closed position within the valve. In the various embodiments of a butterfly-type valve, the butterfly-type valve comprises a valve body defining a flow passage therein, the valve body having at least one bore therein transverse to the flow passage in which a stem depending from a closure disc is received. The various embodiments of a butterfly-type valve further include a closure disc disposed in the flow passage that has at least one stem depending therefrom received in the at least one transverse bore. The stem of the closure disc defines an axis of rotation about which the closure disc rotates between open and closed positions with respect to the flow passage.

In the various embodiments, the butterfly-type valve further includes a resilient cylindrical body liner disposed within the valve body. The resilient cylindrical body liner has a circumferential sealing surface that is engaged by the periphery of the closure disc when the closure disc is rotated to a closed position. The engagement by the periphery of the closure disc establishes a seal between the circumferential sealing surface and the periphery of the closure disc to effectively close the valve off.

In the various embodiments, the butterfly-type valve further includes at least one partially circumferential resilient band that is at least partially interposed between the valve body and the resilient cylindrical body liner. At least a portion of the resilient band has a reduced thickness, which reduces the forces associated with the engagement of the closure disc with the circumferential sealing surface of the resilient cylindrical body liner.

In some embodiments, the thickness of the resilient band is reduced in portions of the band that are transversely distant from the axis of rotation of the closure disc. The at least one partially circumferential resilient band may have a variable thickness that reduces as the transverse distance between the closure disc's axis of rotation and the partially circumferential resilient band increases. The resilient band permits some deflection in the circumferential sealing surface upon engagement by the closure disc with the circumferential sealing surface. The reduced thickness in the bands reduces the forces associated with the deflection of the circumferential sealing surface upon engagement by the closure disc. By reducing the thickness of the resilient band along the portions that are more transversely distant from the axis of rotation, the forces along the band associated with the engagement by the closure disc are reduced such that the moment about the axis or rotation cause by these forces is reduced. Accordingly, the reduced thickness thereby reduces the unseating torque required to overcome the resistance to movement of the closure disc caused by the engagement with the circumferential sealing surface.

In one or more embodiments, the at least one resilient band is configured to permit deflection of the circumferential liner wall upon engagement with the periphery of the closure disc. In some embodiments, the at least one resilient band comprises a center portion having an opening therein, and the remaining portions of the band depend from the center portion. At least a portion of the remaining portions may be tapered, wherein the tapered portions have a reduced thickness that reduces the forces associated with the deflection of the circumferential liner wall. The reduced thickness thereby reduces the unseating torque required to overcome the resistance to movement of the closure disc caused by its engagement with and deflection of the circumferential liner wall of the valve body liner. In at least one embodiment, the taper in the resilient band has a reduction in thickness of at least 0.050 inches at a portion of the resilient band that is furthest from the first portion having an opening therein.

In other exemplary embodiments of a butterfly-type valve, the at least one resilient band comprises two resilient bands, each resilient band including a first portion having an opening therein and tapered portions depending therefrom that are adapted to be least partially interposed between the valve body and the resilient cylindrical body liner. In these exemplary embodiments, the two resilient bands are configured to permit deflection of the circumferential liner wall upon engagement by the closure disc. The tapered portions reduce in thickness to reduce the forces associated with the engagement by the periphery of the closure disc, to thereby reduce the unseating torque required to overcome the engagement between the periphery of the closure disc and the liner's circumferential sealing surface. In at least one embodiment, the tapered portion of the resilient band has a reduction in thickness in the range of 0.050 to 0.090 inches that is effective to reduce the unseating torque.

Referring to FIG. 1, the valve 100 is characterized by a generally cylindrical butterfly type closure disc interposed in a longitudinal flow passage 108 within a valve housing 110. The valve housing 110 is preferably made of two opposed semi-cylindrical parts 116 and 118 that are joined together to form a cylindrical valve housing with a longitudinal flow passage 108 therethrough. It should be noted that the cylindrical valve housing 110 may be formed from any number of parts, or integrally formed as one piece, and the valve of the present invention should not be limited to any specific number of parts. A closure disc 120 is interposed within the flow passage 108 of the valve housing 110, and may be rotated about an axis "A" between at least a partially open position and a closed position as shown in FIG. 1.

Figure 2:
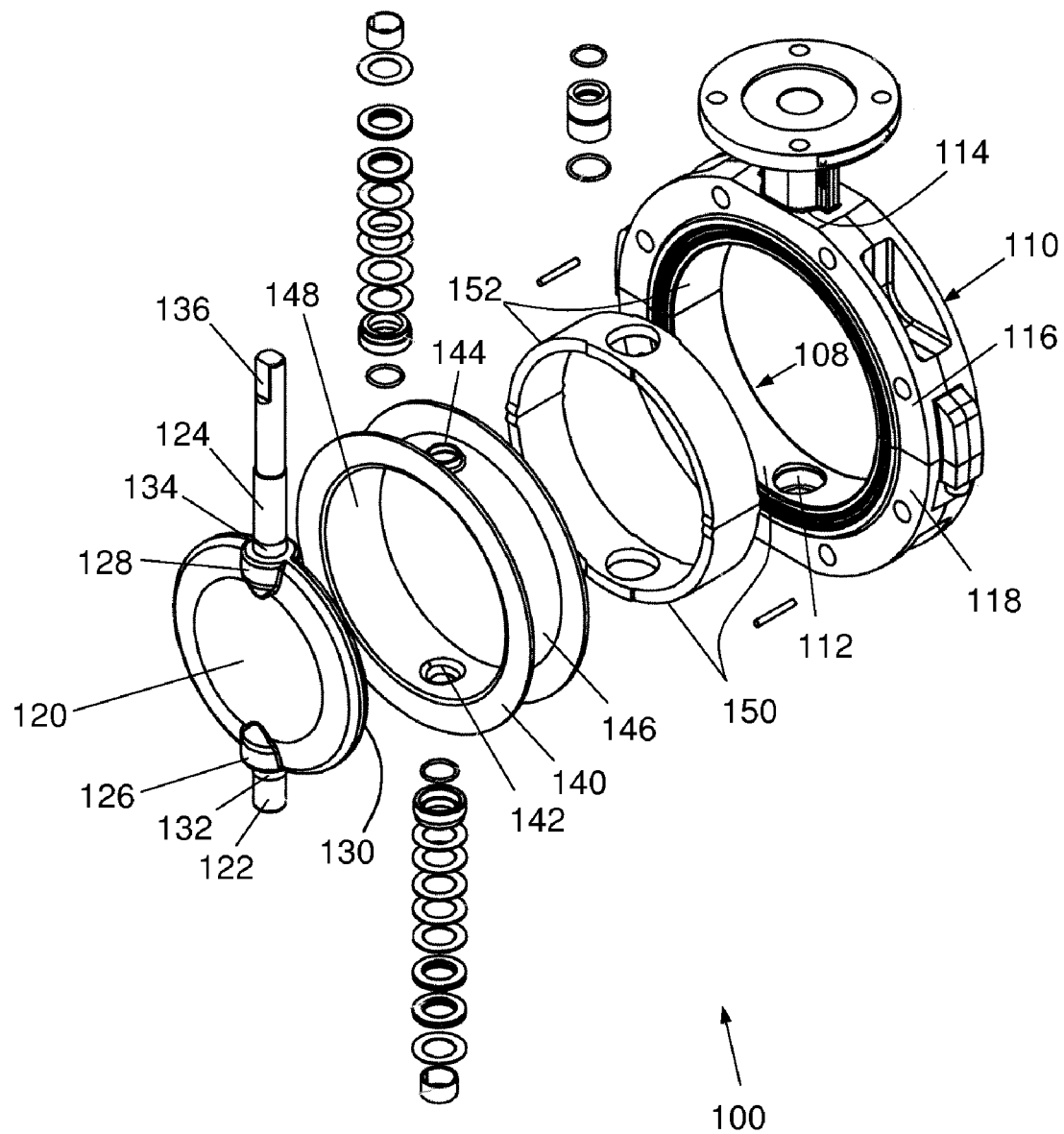
FIG. 2 is an exploded view of the embodiment of the valve housing, closure disc and other components shown in FIG. 1.

Referring to FIG. 2, the closure disc 120 includes opposed coaxial stem portions 122 and 124, which are received within bores 112 and 114 in the valve housing 110. The stem portions 122 and 124 depend from generally cylindrical bosses 126 and 128 on the closure disc 120. It should be noted that the bosses and the stem portions may be separate components assembled to the closure disc, or may be integral formed or over molded onto the stem portions or closure disc, or joined together by any other comparable means. The stem portion 124 of the closure disc 120 includes a drive tang 136, which is adapted to be connected to a suitable drive mechanism for rotating the closure disc 120 about the longitudinal central axis "A" of the stem portions 124 and 122.

The valve 100 shown in FIG. 2 includes a cylindrical valve body liner 140, which is shown separate from the valve 100. The cylindrical valve body liner 140 is disposed within the cylindrical passage opening 108 in the valve housing 110, and is preferably held captive between the valve housing parts 116 and 118. The cylindrical valve body liner 140 has a circumferential wall 146 that defines a circumferential sealing surface 148, which the periphery of the closure disc 120 seats against when the closure disc is rotated to a closed position in which the closure disc 120 is substantially perpendicular to the rotational axis "A". In the closed position, the periphery of the closure disc 120 includes a circumferential sealing surface 130, which engages the cooperating circumferential sealing surface 148 of the cylindrical valve body liner 140.

The cylindrical valve body liner 140 further includes sleeve portions 142 and 144 therein, in which the stem portions 122 and 124 of the closure disc 120 are received in a manner that permits rotation of the stem portions 122 and 124 (and closure disc 120) relative to the valve body liner 140. The sleeve portions 142 and 144 in the cylindrical valve body liner 140 align with the bores 112 and 114 in the valve housing 110. It should be noted that the sleeve portions 142 and 144 may be integrally formed with the cylindrical valve body liner 140, or may alternatively comprise separate components that are fitted or disposed on the cylindrical valve body liner 140. Similarly, the sleeve portions 142 and 144 may alternatively comprise any bushing, sleeve or bearing design suitable for use in connection with rotating component parts.

The stem portions 122 and 124 may further comprise sleeve components 132 and 134 disposed around the stem portions 122 and 124, which mate with cooperating sleeve portions 142 and 144 in the cylindrical valve body liner 140, to provide for aligned rotation of the stem portions 122 and 124 of the closure disc 120 relative to the cylindrical valve body liner 140. The cylindrical valve body liner 140 is preferably made of plastic, but may be alternatively made from any material that is suitable for use in forming sealing surfaces, and compatible for use with various fluids and gasses communicated by such valves. The sleeve components 132 and 134 may be integrally formed with the stem portions 122 and 124, or may be over molded, press-fit or assembled onto the stem portions by any suitable means of manufacture. The sleeve portions or sleeve components may be made from a self-lubricating and corrosion resistant material, but may alternatively be made from any material suitable for use in connection with rotating component parts.

The valve 100 further comprises a circumferential resilient band that is interposed between the valve housing 110 (the opening defined by parts 116 and 118) and the cylindrical valve body liner 140. It should be noted that the resilient band preferably comprises two opposed partially circumferential resilient bands 150 and 152, but may be one contiguous part or several parts assembled in combination. The two resilient bands are shown in FIG. 2 both unassembled and assembled within the valve 100. Each of resilient bands 150 and 152 may be positioned on opposing parts 116 and 118. Accordingly, when the two valve housing parts 116 and 118 are fitted over the cylindrical valve body liner 140, the two resilient bands 150 and 152 form a substantially continuous circumferential resilient band between the valve housing and the cylindrical valve body liner 140.

Figure 3:
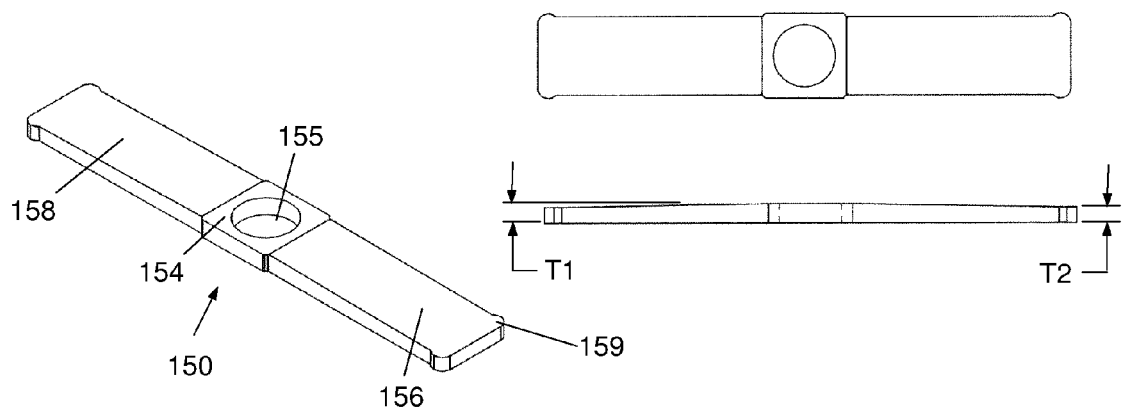
FIG. 3 shows an elevation view, side plane view and top plane view of a resilient band in the valve embodiment shown in FIG. 1.

In this first embodiment shown in FIG. 2, the two resilient bands 150 and 152 form a substantially continuous circumferential resilient band between the valve housing and the cylindrical valve body liner 140. Referring to FIG. 3, the resilient bands 150 and 152 each comprise a central portion 154 having a predetermined thickness T1 and a bore 155 therein, through which the sleeve portion and stem portion may extend. In this first embodiment, the predetermined thickness T1 is in the range of 0.340 inches to 0.360 inches. The resilient bands 150 and 152 each comprise tapered portions 156 and 158 depending from the central portion, wherein the ends of the tapered portions 156 and 158 have a thickness T2 that is less than the predetermined thickness of the central portion. The tapered portions 156 and 158 have a reduction in thickness in the range of 0.050 to 0.090 inches. The portions 156 and 158 may further include tabs 159 at the end portion, as shown in FIG. 3.

Figure 4:
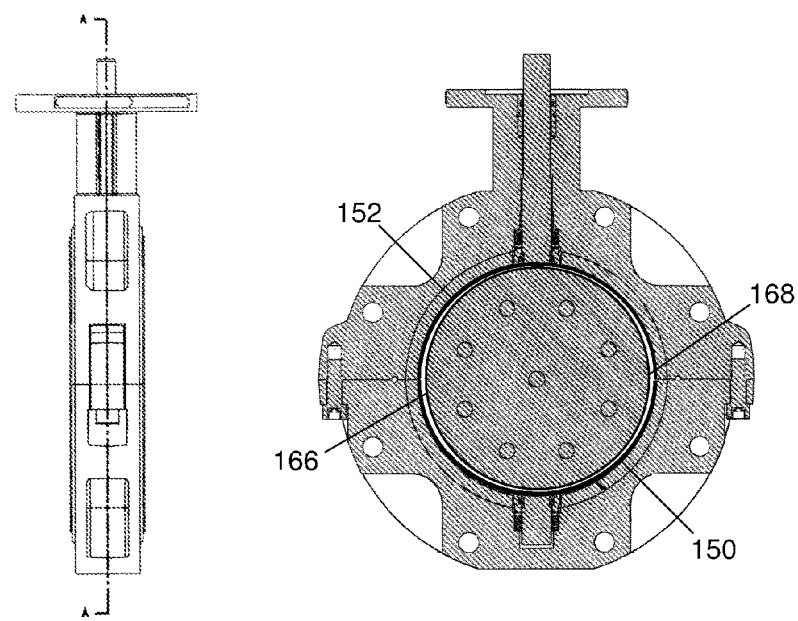
FIG. 4 is a cross-sectional view of the valve shown in FIG. 1 illustrating the taper in the resilient bands in FIG. 3.
Figure 5:
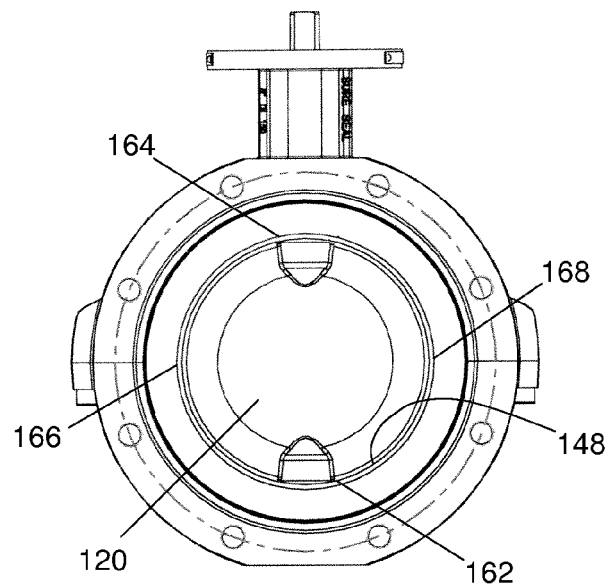
FIG. 5 is a side elevation view of the valve housing, closure disc and other components shown in FIG. 1.

Accordingly, the two partially circumferential resilient bands 150 and 152 form a substantially continuous resilient band that tapers from a predetermined thickness near the stem portions to a reduced thickness near the radial points 166 and 168, as illustrated in the cross-sectional view in FIG. 4 (the spacing and thicknesses of the resilient portions 150 and 152 have been slightly exaggerated to more clearly illustrate the taper). This taper in the resilient bands 150, 152 help reduce the unseating torque required to rotate the closure disc 120 away from a seated "closed" position of engagement with circumferential sealing surface 148, as will be explained below.

Referring to FIG. 2, when the closure disc 120 is rotated to a closed position, the periphery of the closure disc 120 will engage the inner liner's circumferential wall 148 to establish and effective seal. Because of the elastic nature of the resilient bands 150 and 152, the cylindrical valve body liner 140 may experience some deflection in the liner's circumferential wall 146 upon engagement thereby with the periphery of the closure disc 120. Accordingly, the resilient bands 150 and 152 permit some deflection of the valve body liner's circumferential sealing surface 148, to assist in establishing a substantially fluid tight seal between the closure disc 120 and the circumferential sealing surface 148 of the valve body liner 140. Once periphery of the closure disc 120 has been rotated to a "closed" position of engagement with the valve body liner's circumferential sealing surface 148, the frictional forces between the closure disc and the circumferential sealing surface 148 must be overcome to rotate the closure disc 120 away from the closed position of engagement. The torque that is required move the closure disc 120 from its closed, seated position may be referred to as the unseating torque.

Where the frictional forces established by the engagement between the circumferential sealing surface 148 and the periphery of the closure disc 120 may be uniformly distributed about the circumference, the moment about the axis is not uniformly distributed along the axis length due to the varying moment arm relative to the axis of rotation. The frictional force established by the engagement between the valve body liner's circumferential sealing surface 148 and the periphery of the closure disc 120 at the radial points 166 and 168 furthest from the disc's axis of rotation A will have the greatest contribution to the rotational "unseating torque" required to rotate the closure disc 120 away from a closed and seated position of engagement. This is because the frictional force at radial points 166 and 168 are at the furthest distance from the disc's axis of rotation A, about which a greater moment is created. Inversely, the frictional force established by the engagement between the circumferential sealing surface 148 and the periphery of the closure disc 120 at the radial points 162 and 164 nearest to the disc's axis of rotation A will have the least contribution to the rotational "unseating torque" required to rotate the closure disc away from a closed and seated position of engagement. This is because the frictional force at radial points 162 and 164 are at the least distance from the disc's axis of rotation A, about which a lesser moment is created.

By providing a resilient band that taper to a reduced thickness at radial points 166 and 168, the elastic nature and reduced thickness of the resilient bands 150 and 152 near points 166 and 168 will reduce the force required for causing a deflection in the liner's circumferential wall 146 near points 166 and 168 (relative to the force required at points 162 and 164). Thus, the engagement of the periphery of the closure disc 120 with the liner's circumferential sealing surface 148 at points 166 and 168 will result in a relative reduction in the frictional forces associated with the engagement between the periphery of the closure disc and the circumferential sealing surface 148 at points 166 and 168 (relative to frictional forces at points 162 and 164). In reducing the frictional forces near points 166 and 168, which are at the furthest distance from the disc's axis of rotation A where the greatest moment would be created, the moment resulting from the frictional forces at radial points 166 and 168 is reduced. The novel resilient bands that taper to a reduced thickness at the radial point furthest from the axis of rotation provide the advantageous result of reducing the moment that would need to be overcome the resistance cause by the engagement and deflection of the liner's circumferential sealing surface, to "unseat" the closure disc 120 from the liner's circumferential sealing surface 148. This allows for a reduction in the "unseating" torque required to rotate the closure disc 120 away from its seated closed position, which reduces the torque requirements of the drive mechanism (not shown) that engages the drive tang 136.

EXAMPLES

Various samples were made of a second embodiment of a butterfly-type valve, which comprises an 8 inch valve diameter. The second embodiment of a butterfly type valve the valve comprised a valve body having a bore therein, a resilient cylindrical body liner disposed within the valve body, and a closure disc having a stem portion received in the bore in the valve body, which defines an axis of rotation about which the closure disc rotates between open and closed positions.

The second embodiment further included two resilient bands similar to that shown in FIG. 3. The two resilient bands form a substantially continuous circumferential resilient band between the valve body and the cylindrical valve body liner. The resilient bands each comprise a central portion having a bore therein, and a predetermined thickness in the range of 0.445 inches to 0.475 inches. The resilient bands each comprise portions extending from the central portion. At least a portion of the depending band portions are tapered, wherein the ends of the portions depending from the central portion have a thickness that is less than the predetermined thickness of the central portion. The taper in the resilient bands are in the range of 0.065 inches to 0.115 inches. The resilient bands were preferably made of an elastomer material, which may be a silicone, rubber or other suitable compressible material.

The tapered portions depending from the central portion are adapted to be at least partially interposed between the valve body and the resilient cylindrical body liner. The two resilient bands are configured to permit deflection of the circumferential liner wall upon engagement by the closure disc, wherein the tapered portions have a reduced thickness that reduces the forces associated with the forces associated with the engagement by the periphery of the closure disc.

Figure 6:
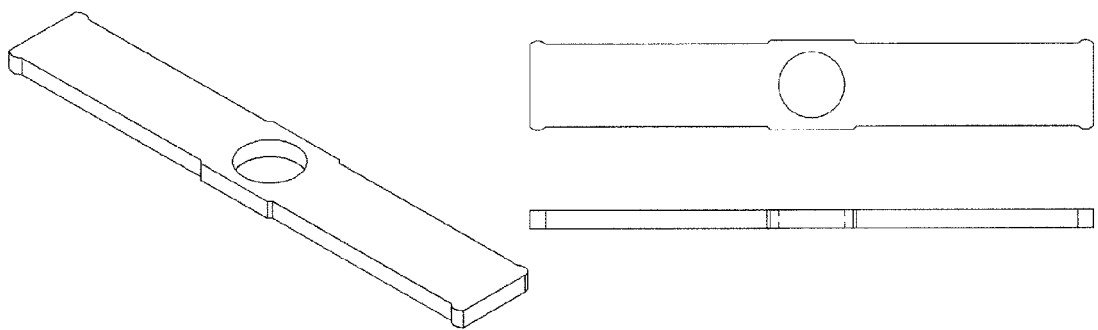
FIG. 6 is an elevation view, side plane view and top plane view of a resilient band having a constant thickness.

In addition to the samples made according to the second embodiment, additional 8 inch diameter valve samples were made that included a resilient band of constant thickness as shown in FIG. 6. These samples were made for comparison purposes, and were found to require an "unseating" torque of approximately 150 foot-pounds of torque to overcome the forces associated with the engagement between the closure disc and the liner's circumferential sealing surface. The comparison samples also had a 70 percent pass rate for internal leakage testing performed on the samples at 165 pounds per square inch (gage).

In the samples made according to the second embodiment, the two resilient bands reduce the unseating torque required to overcome the engagement between the closure disc and the liner's circumferential sealing surface to approximately 90 foot-pounds of torque. The samples made according to the second embodiment also had a 90 percent pass rate for internal leakage testing performed on the samples at 165 pounds per square inch (gage).

Various samples were made of a third embodiment of a butterfly-type valve, which comprises a 12 inch valve diameter. The third embodiment of a butterfly type valve the valve comprised a valve body having a bore therein, a resilient cylindrical body liner disposed within the valve body, and a closure disc having a stem portion received in the bore in the valve body, which defines an axis of rotation about which the closure disc rotates between open and closed positions.

The third embodiment further included two resilient bands similar to that shown in FIG. 3. The two resilient bands form a substantially continuous circumferential resilient band between the valve body and the cylindrical valve body liner. The resilient bands each comprise a central portion having a bore therein, and a predetermined thickness in the range of 0.460 inches to 0.490 inches. The resilient bands each comprise portions extending from the central portion. At least a portion of the depending band portions are tapered, wherein the ends of the portions depending from the central portion have a thickness that is less than the predetermined thickness of the central portion. The taper in the resilient bands are in the range of 0.090 to 0.140 inches. The resilient bands were preferably made of an elastomer material, which may be a silicone, rubber or other suitable compressible material.

The tapered portions depending from the central portion are adapted to be at least partially interposed between the valve body and the resilient cylindrical body liner. The two resilient bands are configured to permit deflection of the circumferential liner wall upon engagement by the closure disc, wherein the tapered portions have a reduced thickness that reduces the forces associated with the forces associated with the engagement by the periphery of the closure disc.

In addition to the samples made according to the third embodiment, other 12 inch diameter valve samples were made that included a resilient band of constant thickness as shown in FIG. 6. These samples were made for comparison purposes, and were found to require an "unseating" torque of approximately 295 foot-pounds of torque to overcome the forces associated with the engagement between the closure disc and the liner's circumferential sealing surface.

In the 12 inch diameter valve samples made according to the third embodiment, the two resilient bands reduce the unseating torque required to overcome the engagement between the closure disc and the liner's circumferential sealing surface to approximately 250 foot-pounds of torque.

Figure 7:
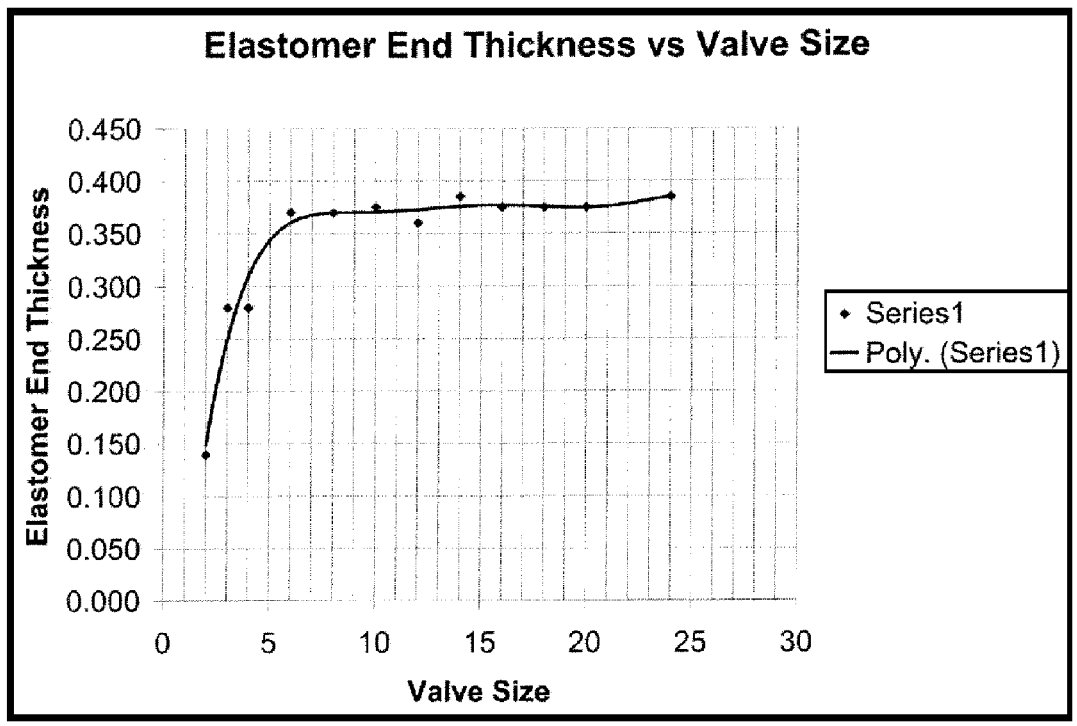
FIG. 7 is a graph showing the relationship between end thickness of a tapered resilient band versus valve size.

Referring to the graph shown in FIG. 7, the relationship between the valve size and the required thickness for the end portion of a tapered resilient band according to the above exemplary embodiments is identified. While the required thickness for the end portion of a tapered resilient band may preferably be found from this graph, it should be noted that the portions of the resilient band depending from the center portion may include a taper on at least a portion thereof, and the amount of taper and required thickness may vary accordingly. As such, the description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A butterfly type valve comprising:
   a valve body defining a flow passage therein;
   a closure disc disposed in the flow passage, the closure disc having an axis of rotation about which the closure disc rotates between open and closed positions with respect to the flow passage;
   a resilient cylindrical body liner disposed within the valve body, the resilient cylindrical body liner having a circumferential sealing surface that is engaged by the periphery of the closure disc to establish a seal when the closure disc is rotated to a closed position;
   a resilient support being at least partially interposed between the valve body and the resilient cylindrical body liner, the resilient support having a thickness that gradually tapers from a portion of the resilient support that is adjacent the rotational axis of the closure disc to a portion of the resilient support that is transversely distant from the rotational axis of the closure disk, wherein the resilient support tapers to a reduction in thickness of at least 0.050 inches at the portion of the resilient support that is transversely distant from the rotational axis.

2. The butterfly type valve according to claim 1 wherein the resilient support comprises at least two bands arranged end to end to form a loop.

3. The butterfly type valve according to claim 2, wherein there are two bands, each being thickest at the center and having an opening therein for accommodating the rotational mounting, and tapering toward the ends.

4. A butterfly type valve comprising:
   a valve body defining a flow passage therein;
   a closure disc disposed in the flow passage, the closure disc having an axis of rotation about which the closure disc rotates between open and closed positions with respect to the flow passage;
   a resilient cylindrical body liner disposed within the valve body, the resilient cylindrical body liner having a circumferential sealing surface that is engaged by the periphery of the closure disc to establish a seal when the closure disc is rotated to a closed position;
   at least one resilient band being at least partially interposed between the valve body and the resilient cylindrical body liner, the resilient band having a thickness that gradually tapers from a portion of the resilient band that is adjacent the rotational axis of the closure disc to a portion of the resilient band that is transversely distant from the rotational axis of the closure disk, wherein at least a portion of the resilient band distant from the axis of rotation is tapered to a reduction in thickness of at least 0.050 inches relative to the thickness of the resilient band portion that is adjacent the axis of rotation, such that the reduced thickness reduces the forces associated with the engagement by the closure disc, to thereby reduce the unseating torque required to overcome the engagement with the liner's circumferential sealing surface.

5. The valve of claim 4 wherein the at least one resilient band has a reduced thickness in a portion of the resilient band that is transversely distant from the axis of rotation.

6. The valve of claim 4 wherein the at least one resilient band includes a gradually tapered cross-section that has a reduction in thickness of at least 0.050 inches at a portion of the resilient band that is transversely distant from the axis of rotation.

7. The valve of claim 4 wherein the at least one resilient band comprises at least one partially circumferential resilient band having a gradually tapering thickness that reduces as the transverse distance between the closure disc's axis of rotation and the partially circumferential resilient band increases.

8. The valve of claim 4 wherein the at least one resilient band comprises a center portion having an opening therein, and gradually tapered portions depending therefrom, the resilient band being configured to permit deflection of the circumferential liner wall upon engagement with the periphery of the closure disc, wherein the gradually tapered portions have a reduced thickness that reduces the forces associated with the deflection of the circumferential liner wall to thereby reduce the unseating torque required to overcome the resistance to movement of the closure disc caused by its engagement with circumferential liner wall.

9. The valve of claim 4 wherein the taper in the resilient band has a reduction in thickness of between about 0.050 inches and about 0.090 inches at a portion of the resilient band that is furthest from the first portion having an opening therein.

10. The valve of claim 4 wherein the at least one resilient band comprises two resilient bands, each resilient band including a first portion having an opening therein and gradually tapered portions depending therefrom that are adapted to extend at least partially between the valve body and the resilient cylindrical body liner, the two resilient bands being configured to permit deflection of the circumferential liner wall upon engagement by the closure disc, wherein the ends of the gradually tapered portions have a reduction in thickness of at least 0.050 inches relative to the thickness of the first portion having the opening, which reduces the forces associated with the engagement by the periphery of the closure disc, to thereby reduce the unseating torque required to overcome the engagement between the periphery of the closure disc and the liner's circumferential sealing surface.

11. A butterfly type valve comprising:
a valve body defining a flow passage therein, the valve body having at least one bore therein transverse to the flow passage;
a closure disc disposed in the flow passage, the closure disc having at least one stem depending therefrom that is received in the at least one transverse bore and defines an axis of rotation about which the closure disc rotates between open and closed positions with respect to the flow passage;
a resilient cylindrical body liner disposed within the valve body, having a circumferential sealing surface that is engaged by the periphery of the closure disc when the closure disc is rotated to a closed position, which engagement establishes a seal between the circumferential sealing surface and the periphery of the closure disc;
at least one partially circumferential resilient band being at least partially interposed between the valve body and the resilient cylindrical body liner, the resilient band having a thickness of that gradually tapers from a portion of the resilient band that is adjacent the rotational axis of the closure disc to a portion of the resilient band that is transversely distant from the rotational axis of the closure disk, wherein at least a portion of the resilient band that is distant from the axis of rotation has a reduction in thickness of at least 0.050 inches relative to the thickness of the resilient band portion that is adjacent the axis of rotation, such that the reduced thickness reduces the forces associated with the deflection of the resilient cylindrical body liner, to thereby reduce the unseating torque required to overcome the resistance to movement of the closure disc caused by the engagement with the circumferential sealing surface.

12. The valve of claim 11 wherein the at least one resilient band comprises two resilient bands, each resilient band including a first portion having an opening therein and gradually tapered portions depending therefrom that are adapted to extend at least partially between the valve body and the resilient cylindrical body liner, the two resilient bands being configured to permit deflection of the circumferential liner wall upon engagement by the closure disc, wherein the ends of the gradually tapered portions have a reduced thickness that reduces the forces associated with the engagement by the periphery of the closure disc, to thereby reduce the unseating torque required to overcome the engagement between the periphery of the closure disc and the liner's circumferential sealing surface.

13. The valve of claim 12 wherein the gradually tapered portion of the resilient band has a reduction in thickness in the range of 0.050 to 0.090 inches.

14. A butterfly type valve comprising:
a valve body defining a flow passage therein;
a closure disc disposed in the flow passage, the closure disc having at least one stem depending therefrom, about which the closure disc rotates between open and closed positions with respect to the flow passage;
a resilient cylindrical body liner disposed within the valve body, the resilient cylindrical body liner including at least one opening therein for receiving the at least one stem, and including a circumferential sealing surface that is engaged by the periphery of the closure disc to establish a seal between the circumferential sealing surface and the periphery of the closure disc when the closure disc is rotated to a closed position;
at least one resilient band being at least partially interposed between the valve body and the resilient cylindrical body liner, wherein the at least one resilient band includes a first portion having an opening therein for receiving the at least one stem, and at least a portion that is transversely distant from said first portion of the band depending from the first portion, said resilient band having a thickness of that gradually tapers from the first portion having an opening to a reduction in thickness of at least 0.050 inches at an end of the at least one portion of the band depending from the first portion, such that the at least one resilient band is tapered to a reduced thickness effective for reducing the unseating torque required to overcome the resistance to rotation of the closure disc caused by the engagement between the periphery of the closure disc and the liner's circumferential sealing surface.

15. The valve of claim 14 wherein the resilient band permits the liner's circumferential sealing surface to deflect upon engagement by the closure disc, and the ends of the gradually tapered portions have a reduction in thickness that is effective to reduce the forces associated with the engagement by the periphery of the closure disc, to thereby reduce the unseating torque required to overcome the engagement between the periphery of the closure disc and the liner's circumferential sealing surface.

16. The valve of claim 14 wherein the resilient band comprises at least one partially circumferential resilient band having gradually tapered portions depending from the first portion having an opening therein, the ends of the gradually tapered portions having a reduction in thickness of at least 0.050 inches relative to the thickness of the first portion having the opening, which is effective to reduce the forces associated with the engagement by the periphery of the closure disc, to thereby reduce the unseating torque required to overcome the resistance to rotation of the closure disc caused by the engagement between the periphery of the closure disc and the liner's circumferential sealing surface.

17. The valve of claim 16 wherein the tapered portions have a reduction in thickness of between about 0.050 inches and about 0.090 inches at a portion of the resilient band that is furthest from the first portion having an opening therein.

18. The valve of claim 14 wherein the at least one resilient band comprises two resilient bands, each resilient band including a first portion having an opening therein and gradually tapered portions depending therefrom that are adapted to extend at least partially between the valve body and the resilient cylindrical body liner, the two resilient bands being configured to permit deflection of the circumferential liner wall upon engagement by the closure disc, wherein the gradually tapered portions have a reduced thickness that reduces the forces associated with the engagement by the periphery of the closure disc, to thereby reduce the unseating torque required to overcome the engagement between the periphery of the closure disc and the liner's circumferential sealing surface.

19. A resilient band having gradually tapered portions depending from at least one center portion having an opening therein, the resilient band being adapted to be interposed between a valve body and a circumferential liner wall, and being configured to permit deflection of the circumferential liner wall when the circumferential liner wall is engaged by a valve closure disc, wherein the ends of the gradually tapered portions have a reduction in thickness of at least 0.050 inches relative to the thickness of the at least one center portion having an opening, which reduces the forces associated with the engagement by the closure disc to thereby reduce the unseating torque required to overcome the resistance to movement of the closure disc caused by the engagement with circumferential liner wall.

20. The resilient band of claim 19 wherein the tapered portions have a reduction in thickness of between about 0.050 inches and about 0.090 inches at a portion of the resilient band that is furthest from the first portion having an opening therein.

* * * * *